United States Patent Office 3,064,003
Patented Nov. 13, 1962

3,064,003
CARBOXYLIC ACID DERIVATIVES OF SUBSTITUTED 4-THIAZOLIDINONES
Gerhard Satzinger, Memingen, Allgau, Germany, assignor to Warner-Lambert Pharmaceutical Company, Morris Plains, N.J., a corporation of Delaware
No Drawing. Filed Mar. 6, 1961, Ser. No. 93,314
2 Claims. (Cl. 260—306.7)

The present invention relates to new and novel compounds of the formula

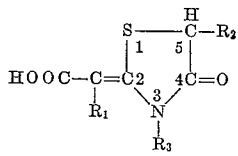

wherein $R_1$ is hydrogen, aryl or lower alkyl, $R_2$ is hydrogen or lower alkyl, and $R_3$ is lower alkyl, and to a method of producing such compounds.

The term "low alkyl" as used in the specification and in the claims refers to branched and straight chain aliphatic groups having 1 to 6 carbon atoms.

The compounds of this invention have interesting pharmacological activity as analgesics, sedatives and anti-inflammatory agents. In use, they may be formulated with conventional pharmaceutical carriers to form such typical dosage units as tablets, capsules, solutions, suspensions, suppositories and the like.

It has now been found that the new and novel compounds of this invention may be prepared by the reaction of a compound of the formula

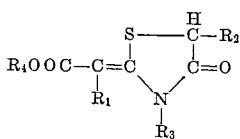

wherein $R_1$, $R_2$ and $R_3$ are as described hereinabove and $R_4$ is a lower alkyl group with a molar excess of a base, such as sodium hydroxide, potassium hydroxide and the like, at a temperature of about 50° C. to about 100° C., followed by neutralization of the reaction mixture with a mineral acid, such as hydrochloric acid, sulfuric acid and the like, at a temperature of less than 0° C. The reaction is normally carried out in aqueous solution. The product is purified by crystallization.

The starting materials of the above formula may be prepared by the following reaction sequence:

First, a substituted 4-thiazolidinone of the formula

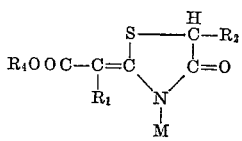

wherein M is an alkali metal is prepared by the reaction of a nitrile of the formula

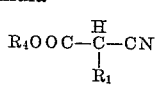

with a mercapto ester of the formula

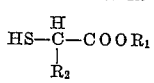

wherein $R^1$ is lower alkyl, in the presence of an aliphatic alcohol having 1 to 6 carbon atoms and an alkali metal, as described in my application entitled "Substituted 4-Thiazolidinones and Process Therefor," filed concurrently herewith, now copending application Serial No. 93,301 filed March 6, 1961.

The starting materials for use in the preparation of the compounds of this invention are then prepared from these substituted 4-thiazolidinones as follows:

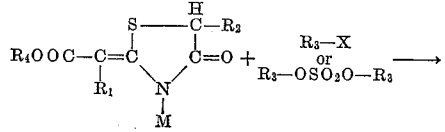

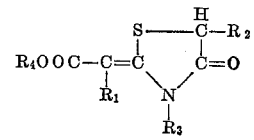

wherein X is halogen, as described in my application entitled "Substituted 4-Thiazolidinones and Process Therefor," filed concurrently herewith, now copending application Serial No. 93,318 filed March 6, 1961.

The following example is included in order further to illustrate the present invention:

EXAMPLE

*2-Carboxymethylene-3-Methyl-4-Thiazolidinone*

20 g. (0.1 mole) 2-carbethoxymethylene-3-methyl-4-thiazolidinone are mixed with 100 ml. 2 N NaOH, the mixture is heated to 60–70° C. and maintained at this temperature for 5 minutes, whereupon a complete solution takes place. The solution is then cooled to —10° C. and, after 10 minutes, is filtered. To the filtrate are slowly added 50 ml. 2 N HCl with vigorous agitation of the mixture and cooling to maintain the temperature at —10° C. The mixture is allowed to stand at —10° C. for 30 minutes and thereafter is filtered. The crystals are washed successively with water, ethanol and ether and recrystallized from dioxan to yield 14 g. (82%) of 2-carboxymethylene-3 - methyl-4 - thiazolidinone as colorless crystals, melting point 176° C. dec.

*Analysis.*—Calc.: C, 41.60; H, 4.08; N, 8.09; S, 18.52. Found: C, 41.68; H, 3.93; N, 8.11; S, 18.00.

By a similar procedure other carboxylic acid derivatives of substituted 4-thiazolidinones may be prepared, for example 2-(α-carboxybenzylidene) 3-methyl-4-thiazolidinone, 2-(α-carboxyethylidene)-3-methyl-4-thiazolidinone, 2-carboxymethylene-3-methyl-5-methyl-4-thiazolidinone, 2 - (α - carboxyethylidene) - 3 - ethyl-5-methyl-4-thiazolidinone, and the like.

It is understood that the foregoing detailed description is given merely by way of illustration and that many variations may be made therein without departing from the spirit of my invention.

Having described my invention, what I desire to secure by Letters Patent is:

1. A compound of the formula

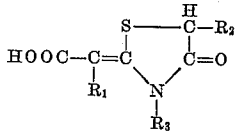

wherein $R_1$ is a member selected from the group consisting of hydrogen, phenyl and lower alkyl, $R_2$ is a member selected from the group consisting of hydrogen and lower alkyl and $R_3$ is lower alkyl.

2. 2-carboxymethylene-3-methyl-4-thiazolidinone.

References Cited in the file of this patent
UNITED STATES PATENTS 2,743,278    Knott _____ Apr. 24, 1956
2,934,540    Sheehan _____ Apr. 26, 1960

OTHER REFERENCES

Karrer: "Organic Chemistry" (Elsevier), page 212 (1950).